Figure 1:
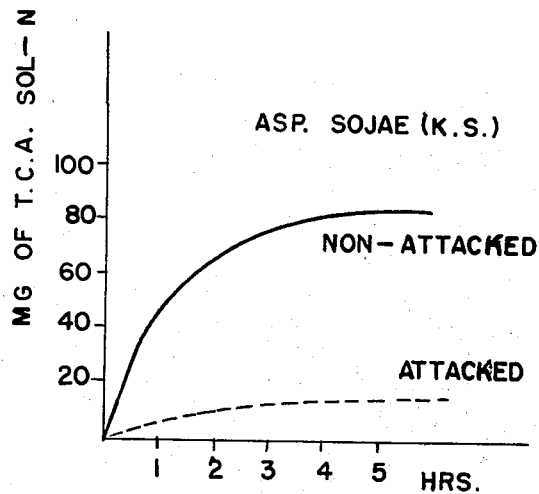

Aug. 19, 1958  
FUMIHIKO YOSHIDA  
2,848,371  
METHOD OF PRODUCING AND PURIFYING A NEW PROTEOLYTIC ENZYME  
Filed Jan. 23, 1956  
5 Sheets-Sheet 1

INVENTOR  
FUMIHIKO YOSHIDA  
BY  
ATTORNEYS

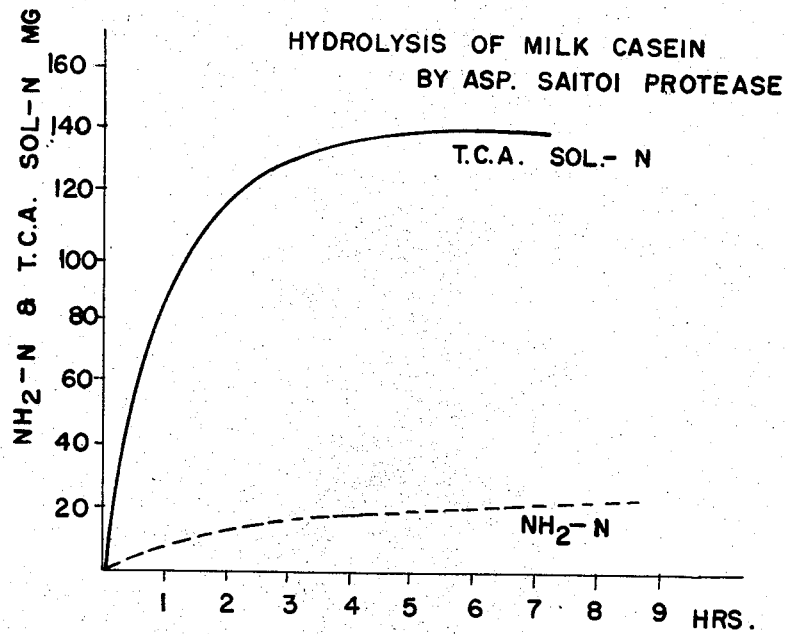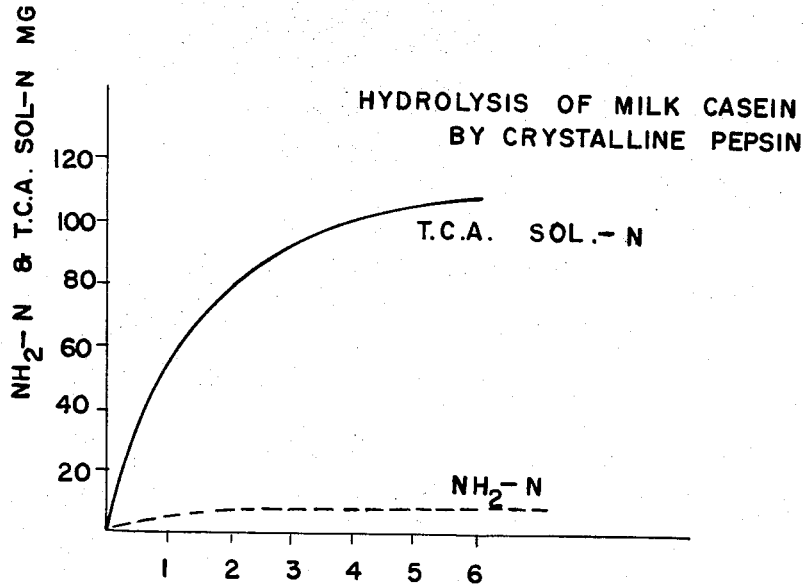

Aug. 19, 1958 FUMIHIKO YOSHIDA 2,848,371
METHOD OF PRODUCING AND PURIFYING A NEW
PROTEOLYTIC ENZYME
Filed Jan. 23, 1956 5 Sheets-Sheet 4

INACTIVATION OF ASP. SAITOI PROTEASE AT PH 3.0 & 55°C

INVENTOR
FUMIHIKO YOSHIDA
BY
Wenderoth, Lind & Ponack
ATTORNEYS

United States Patent Office 2,848,371
Patented Aug. 19, 1958

2,848,371
METHOD OF PRODUCING AND PURIFYING A NEW PROTEOLYTIC ENZYME

Fumihiko Yoshida, Chiba-ken, Japan, assignor to Noda Industrial and Scientific Research Laboratory, Noda-Shi, Chiba-ken, Japan Application January 23, 1956, Serial No. 560,775

5 Claims. (Cl. 195—62)

The present invention relates to a method of producing and purifying a new proteolytic enzyme.

Various agents for producing proteolytic enzymes are known. Each of them except pepsin has an optimum pH for weak acidity, neutrality or weak alkalinity. As a result of examining the proteolytic enzymes of molds belonging to Aspergillus saitoi, Aspergillus usamii, Aspergillus awamori and other black Aspergillus, the present inventor has discovered that each of these strains has an optimum pH of 2.5 to 3.0 and a strong resistivity to acid and that some of them contain enzymes as strong as Aspergillus oryzae and Aspergillus sojae.

Said enzyme is a new proteolytic enzyme which has never been obtained from micro-organisms or vegetables. As a result of researches on a method of obtaining an agent for producing strong proteolytic enzymes by using these strains, the inventor has accomplished the present invention.

The positions of the above mentioned molds in the classification of Aspergillus will be understood from the following table.

(K. Sakaguchi, H. Iizuka and S. Yamagaki: J. Agr. Chem. Soc., Japan, vol. 24, 138, 1951; and H. Iizuka: J. General and Applied Microbiology, vol. 1, No. 1, 10, 1955)

(1) Conidial wall with coloured bars when mature.
(1) Conidial wall smooth, rough or rarely echinulate_____A. niger group.
(2) Colonies black_____Kuro-Koji mold group.
(2) Colonies with brown or olive shades_____(3)
(3) Assimilate nitrites*_____(7)
(4) 1st sterigmata over 30μ_____(4)
(4) 1st sterigmata 13–25μ_____A. batatae, Saito.
(5) Yellow pigment produced_____(5)
(5) Yellow pigment not produced_____A. usamii nov. sp.
(3) Do not assimilate nitrites_____A. usamii var. R-17 nov. var.
(6) 1st sterigmata 15–23μ, conidiophore 2-3 mm. or more_____(6)
(6) 1st sterigmata up to 16μ, colonies somewhat mummy brown_____A. saitoi nov. sp.
(6) 1st sterigmata 10–13μ, conidiophore under 1.5 mm., conidial head crowded_____A. saitoi var. R-16 nov. var.
(7) Colonies with olive shades, assimilate nitrites_____A. saitoi var. Kagoshima nov. var.
(8) Sterigmata mostly in double series but often mixed with single series in the same heads, 1st sterigmata 5μ_____(8)
(8) Sterigmata in double series ordinary_____A. inuii nov. sp.
(8) Conidial heads scanty_____A. inuii var. K-19 nov. var.
(7) Colonies with brown shades_____A. inuii var. R-7 nov. var.
(9) Assimilate nitrites…A. aureus Nakazawa, A. aureus var. minor Nakazawa et Shimo, A. awamori var. fumeus Nakazawa et Shimo, A. aureus f. sp. R-2
(9) Do not assimilate nitrites_____(10)
(10) Yellow-orange pigment produced in mycelium, conidial heads not seen in ordinary colonies_____A. nakazawai nov. sp.
(10) Yellow-orange pigment not produced_____A. awamori Nakazawa et Shimo, A. awamori var. minimus Nakazawa et Shimo, A. awamori var. piceus Nakazawa et Shimo, A. awamori var. fuscus Nakazawa et Shimo, A. aureus var. acidus Nakazawa et Shimo, A. awamori var. mirinus Nakazawa et Shimo, A. awamori f. sp. R-5, R-9, H-2, and R-1.

*The assimilation of nitrites has been tested by the use of the media; sucrose, 30 gr.; NaNO₂, 1.5 gr.; K₂HPO₄, 1 gr.; KCl, 0.5 gr.; MgSO₄.7H₂O, 0.05 gr.; FeSO₄, 0.05 gr.; in distilled water 1 l.
The species which assimilate nitrites grow readily in 1-2 days at 30–35° C., while the non-assimilating species show none or only scanty growth in the upper part of the agar slant even after 5-10 days.

Aspergillus niger NRRL 337 (amylase producing mold) and Aspergillus niger NRRL 330 (maltase producing mold) are said to be included in Kuro-Koji mold group (K. Sakaguchi and H. Iizuka: J. Agr. Chem. Soc., Japan, vol. 27, No. 8, 524, 1953). An example of the results of comparative experiments made to confirm the acid resistivity and enzyme activity of said enzyme is shown in the following:

Aspergillus saitoi (R–1128) and Aspergillus sojae (K. S.) as inoculated into wheat bran were incubated at 30° C. for 72 hours and were then made to act at 30° C. for 1 hour at the respective optimum pH of 2.5 for said strain No. 1128 and of 6.5 for said K. S. by respectively using 2.5 cc. of the 20% extract thereof with 25 cc. of 5% milk casein as a substrate. Then undegraded protein was precipitated with trichloroacetic acid (T. C. A.). When degraded protein was measured, No. 1128 showed 69.30 mg. and K. S. showed 56.30 mg. By the way, the same result was obtained with the filtrate in the case of the submerged culture in a liquid medium of 3% wheat bran and 2% soybean meal.

Figure 2:
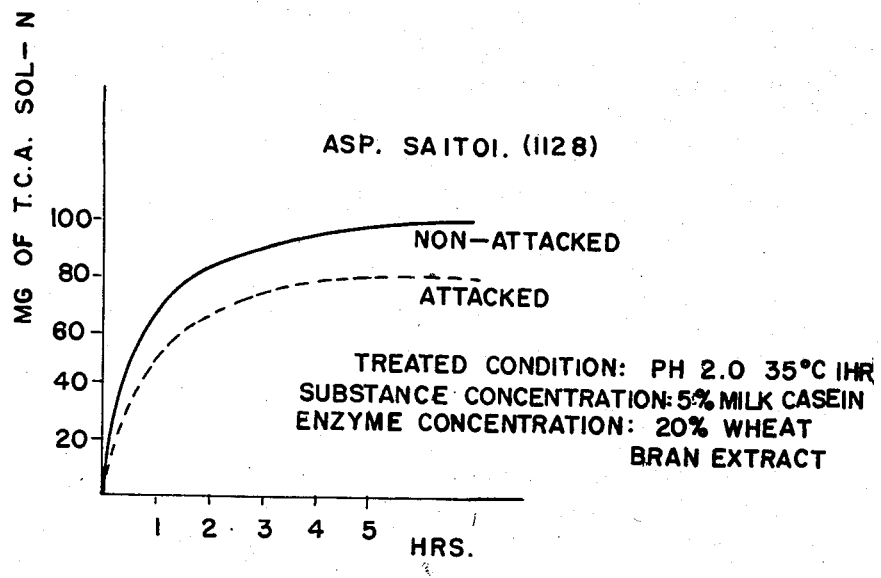

Now, the wheat bran extract of each of Aspergillus sojae (K. S.) and Aspergillus saitoi (1128) was treated at 35° C. for 1 hour at pH 2.0. When the enzyme activity was measured, it was as shown in Figs. 1 and 2. It is seen that Aspergillus saitoi evidently has a strong resistivity as compared with others.

Various other properties of protease crystals obtained from Aspergillus saitoi and purified by being recrystallized twice with acetone shall be described. Said enzyme is in the form of needle-shaped or long plate-shaped crystals. Its isoelectric point is 4.50 to 4.70. Its molecular weight is 93,000 to 98,000. Its protease unit is 6700 [PU] casein 30° FR m. eq. tyr./PN mg. Its protein reactions are shown as follows:

Biuret reaction, +
Million reaction, +
Xanthoprotein reaction, ±
Adamkiewitz reaction, −
Ninhydrin reaction, ±
Neubauer-Rhode reaction, −

As regards the action on protein, the results of measuring trichloroacetic acid soluble N and $NH_2$—N by using the protease crystals of Aspergillus saitoi and crystalline pepsin (made by G. B. I.) with milk casein as a substrate are shown in Figs. 3 and 4. In such case, T. C. A. soluble N/$NH_2$—N is taken as in Table 1.

TABLE 1

| Time | 30 min. | 1 hr. | 2 hrs. | 3 hrs. | 4 hrs. | 5 hrs. | 6 hrs. | 7 hrs. | 8 hrs. |
|---|---|---|---|---|---|---|---|---|---|
| Hydrolysis Ratio: | | | | | | | | | |
| milk casein by Asp. saitoi protease | 12.3 | 12.3 | 10.0 | 9.1 | | 7.2 | 6.8 | 6.4 | |
| milk casein by Pepsin | 15.6 | 14.9 | 15.1 | 15.1 | 15.3 | 15.7 | 15.3 | 14.5 | |

As seen in the above table, said ratio is almost constant in the case of pepsin but gradually decreases in the case of the present protease. That is to say, this fact shows that the present enzyme is different in action from pepsin and finely cuts the molecule of the substrate.

Figure 5:
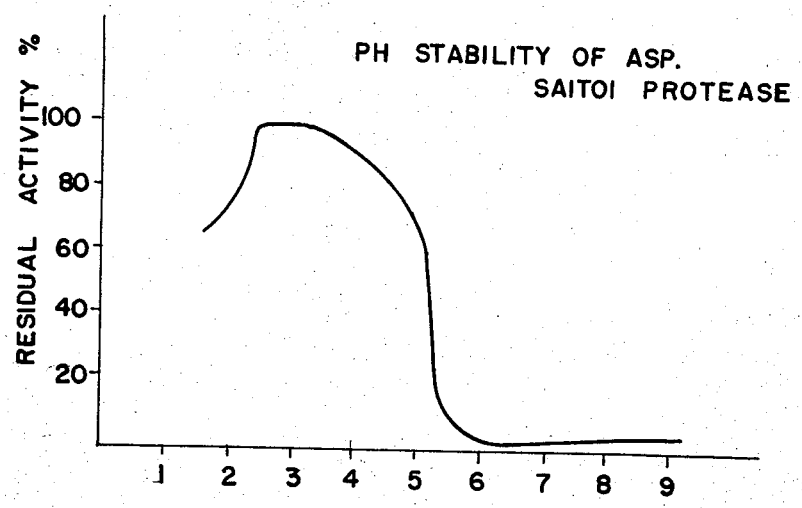

As regards the stability of pH, the results of measuring the residual enzyme activity after the enzyme solution is left at 30° C. for 30 minutes with its pH adjusted to be 1.5 to 8.0 are as shown in Fig. 5. That is to say, the activity is lost by the treatment at pH 5.5. The optimum pH is 2.5 to 3.0 with milk casein, soybean-α-protein (made by G. B. I.), egg albumin or haemoglobin as a substrate.

Figure 6:
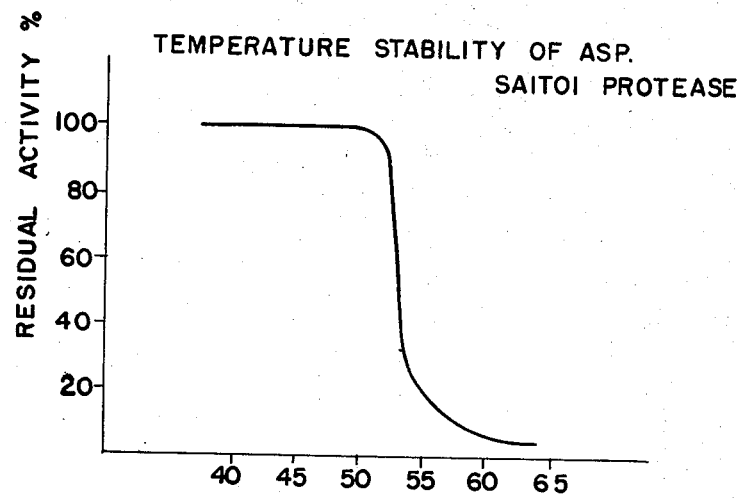
Figure 7:
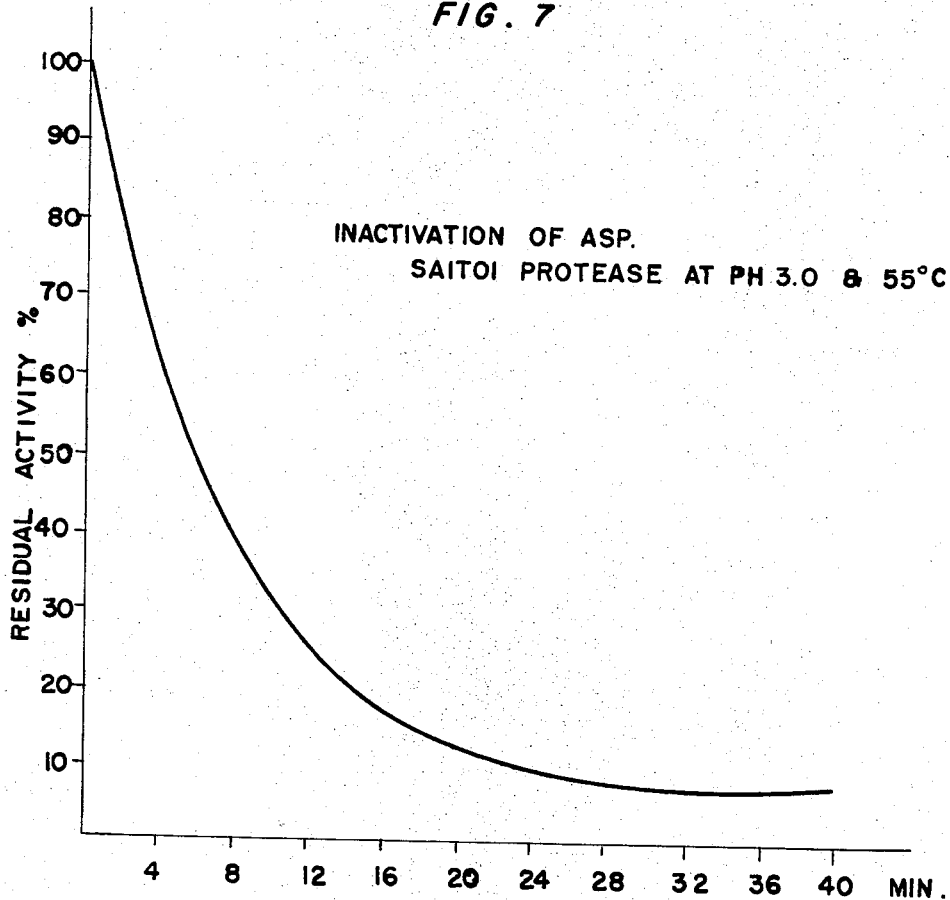

As regards the denaturation and thermal stability, the activity is lost by the treatment at 55° C. for 10 minutes. (Fig. 6). The optimum temperature is 35 to 40° C. when the substrate is milk casein. The thermal denaturation feature is shown by Fig. 7 and represented by the following formula:

$$[P] = 55.7e^{-0.0648t} + 44.3e^{-0.2104t}$$

In this case, various metallic ions do not show any protective action against thermal denaturation. The effects on various inhibitors are as shown in Table 2.

TABLE 2

| Inhibitor | Final Concentration | Inhibition Ratio |
| --- | --- | --- |
| Iodine | $10^{-3}$ M | 100 |
| Potassium permanganate | $10^{-3}$ M | 100 |
| P. C. M. B. | $10^{-2}$ M | 34.2 |
| Mercurous acetate | $10^{-2}$ M | 81.3 |
| Monochlor acetic acid | $10^{-3}$ M | 8.2 |
| L-Cystine | $10^{-2}$ M | 9.6 |
| Ascorbic acid | $10^{-3}$ M | 0 |
| 8-Hydroxyquinoline | $10^{-3}$ M | 15.4 |
| E. D. T. A. | $10^{-2}$ M | 21.3 |
| Sodium azide | $10^{-2}$ M | 4.9 |
| Sodium pyrophosphate | $10^{-2}$ M | 3.8 |
| Sodium oxalate | $10^{-3}$ M | 0 |
| Manganese chloride | $10^{-3}$ M | 5.4 |
| Zinc chloride | $10^{-2}$ M | 10.3 |
| Cobalt chloride | $10^{-2}$ M | 0 |
| Sodium laurylsulfonate | $10^{-3}$ M | 100 |
| Soybean trypsin inhibitor | 0.4% | 0 |
| Sodium nitrite | $10^{-2}$ M | 18.7 |
| Phenylhydrazin | $10^{-2}$ M | 85.7 |
| Hydroxylamine | $10^{-2}$ M | 73.2 |
| Aniline | $10^{-2}$ M | 96.7 |
| Urea | $10^{-2}$ M | 5.0 |

That is to say, in respect that it is not affected by any metal and not inhibited by any metal chelating agent, it is not a so-called metal protein. In respect that its activity on various inhibitors is similar to that of pepsin, a common point is considered to exist in the functional groups.

Figure 8:
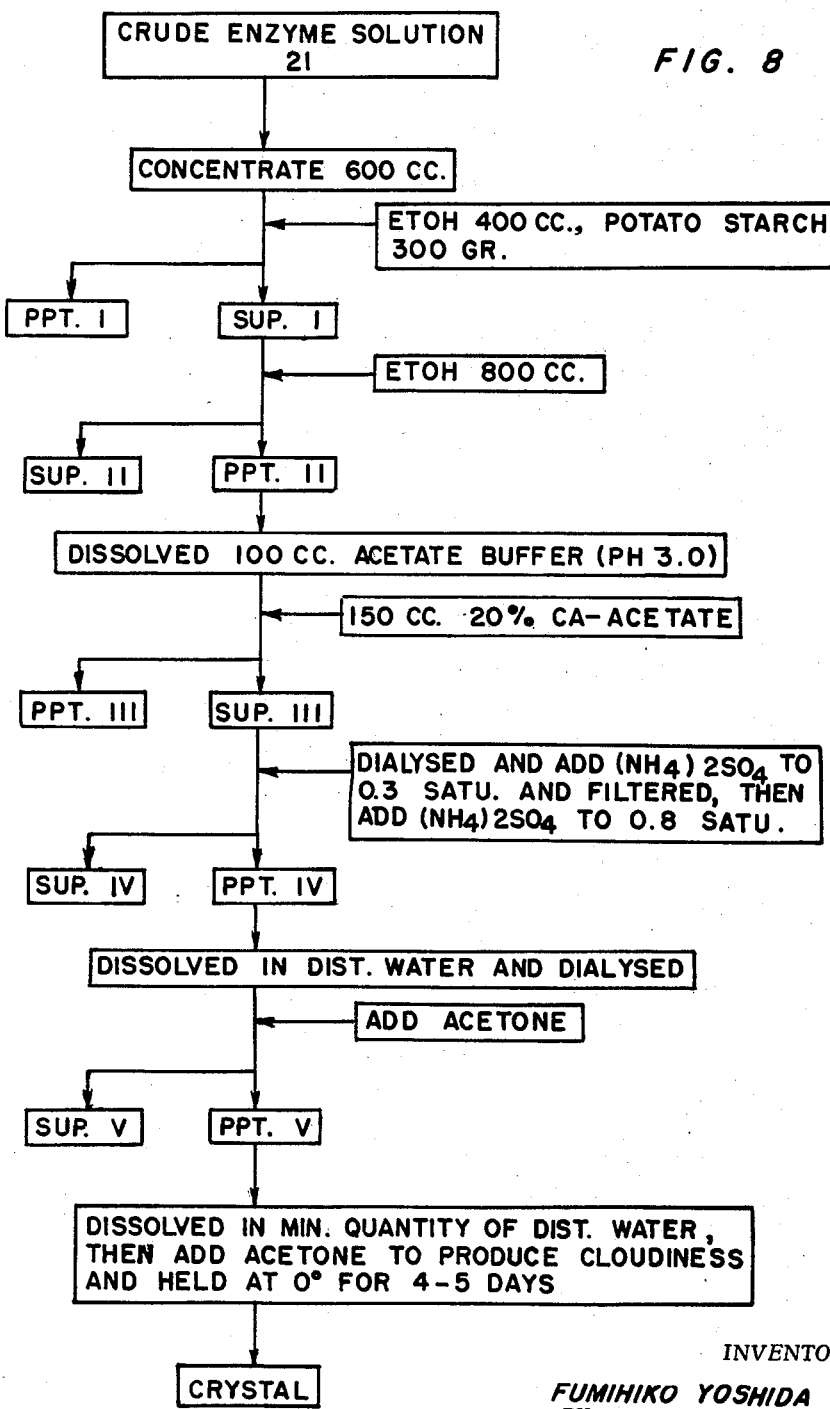

An example of the method of producing the enzyme of the present invention shall be explained with reference to Fig. 8.

Aspergillus saitoi (1128) was inoculated into wheat bran, was incubated at 30° C. for 3 days and was extracted with water (pH 2.0 to 40) in an amount three times as large. 2 liters of this solution were concentrated to 600 cc. at a low temperature in vacuo. 400 cc. of EtOH were added thereto. 300 g. of potato starch were further added to the mixture. The resultant mixture was stirred for 1 hour. The starch was removed by filtration. 800 cc. of EtOH were further added thereto at −10° C. (The enzyme activity of this precipitate was as shown in the later mentioned Table 3 and was almost comparable to that of existing Taka diastase, etc.). The precipitate was dissolved in 100 cc. of acetate buffer (pH 3.0) and was filtered with the addition of 150 cc. of 20% Ca-acetate. This filtrate was dialyzed and insolubles were removed. $(NH_4)_2SO_4$ was added thereto. Insolubles were removed at 0.3 saturation. The filtrate was further made to be at 0.8 saturation. This precipitate was filtered. The precipitate was dissolved in water and dialyzed. Acetone was added thereto at a low temperature so as to be 50%. Here amylase and other enzymes were hardly contained. The mixture was then dissolved in a small amount of water. Acetone was added thereto so that the mixture might be slightly cloudy. The mixture was filtered and was left for 4 to 5 days. Then crystals were obtained. When the crystals were grown with the further addition of acetone, were centrifuged and were lyophiled, about 100 mg. of crystals were yielded. It was necessary to carry out the whole operation with pH 2.5 to 4.0 at which the enzyme was stable. The yield and activity of each fraction of the enzyme are shown in Table 3.

TABLE 3

*Yield and activity of each fraction of Aspergillus saitoi protease*

| Fraction | Yield, Percent | (PU)/PN mg. |
| --- | --- | --- |
| Enz. Soln | 100 | 340 |
| EtOH ppt. Soln | 83 | 770 |
| Ca-acetate treated | 69 | 900 |
| $(NH_4)_2SO_4$ salting out | 41 | 2,900 |
| Acetone ppt. Soln | 27 | 5,250 |
| Crystal | 3 | 6,700 |

Figure 9:
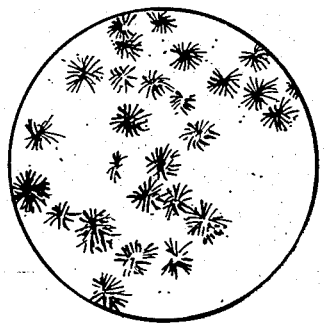

As compared with crystalline pepsin, the present crystalline enzyme has about half activity in milk casein digestion. The optimum pH for milk casein digestion was 2.7 to 2.9 and was evidently different from that of the enzyme of Aspergillus oryzae. The crystals of the new enzyme are shown in Fig. 9.

As described above, a new proteolytic enzyme which has not been known before can be separated by the present invention from black Aspergillus. In view of the specific optimum pH for the proteolysis of the new enzyme, the present invention has a wide range of utilization and is very useful. The present new enzyme is useful as digestant, haze-removing agent for beer, sake, vinegar and the like brewing products.

What I claim is:

1. The crystalline protease obtained from wheat bran cultures of a black Aspergillus type mold selected from the group consisting of Aspergillus saitoi, Aspergillus usamii, and Aspergillus awamori, said protease forming plate-shaped to needle-shaped crystals which have a molecular weight ranging from about 93,000 to 98,000, are acid-stable, have an isoelectric point of 4.50 to 4.70, exhibit their greatest activity between pH 2.5 and 3.0, have an optimum pH for milk casein digestion between 2.7 and 2.9, and possess a protein unit of 6700 PU/mg. protein-N.

2. The method of obtaining a crystalline protease from a mold of the black Aspergillus type selected from the group consisting of Aspergillus saitoi, Aspergillus usamii, and Aspergillus awamori, which comprises the steps of inoculating a nutrient medium with the Aspergillus, incubating at ordinary temperature, extracting with water at a pH of about 2.5 to 3.0, adding ethyl alcohol and starch to the extract, removing excess starch, precipitating the extract with additional ethyl alcohol, dissolving the precipitate in an acetate type buffer at pH of about 3.0, adding calcium acetate to remove impurities, dialyzing the solution to remove impurities, adding ammonium sulfate, separating the fraction between 0.3 and 0.8 saturation, dialyzing in aqueous solution, and adding acetone to the solution to separate the enzyme in the form of crystals.

3. The method of claim 2 in which the Aspergillus is Aspergillus saitoi.

4. The method of claim 2 in which the Aspergillus is inoculated into wheat bran and incubated at about 30° C. for about 72 hours.

5. The method of claim 2 in which the nutrient medium is a liquid medium including 3% wheat bran and 2% soybean meal.

References Cited in the file of this patent

"The Aspergilli," by Thom et al., 1926; publ. by Williams & Wilkins Co. (Balt.), page 70.

"Chemistry and Technology of Enzymes," 1949, by H. Tauber; publ. by John Wiley & Sons Inc. (N. Y.), pages 19 to 21 and 401 to 404.

"Chemistry and Methods of Enzymes," 1953, by Sumner et al.; publ. by Academic Press Inc. (N. Y.), pages 166 to 169.

"Advances in Enzymology," 1953, vol. 14, edited by F. F. Nord; publ. by Interscience Publ. Inc. (N. Y.), pages 343, 392 to 395, 399 and 402.